(12) United States Patent
Jaeb et al.

(10) Patent No.: US 6,676,175 B2
(45) Date of Patent: Jan. 13, 2004

(54) SECURITY BOX FOR RECORDED MEDIA

(75) Inventors: Michael S. Jaeb, Millersburg, OH (US); Dennis D. Belden, Jr., Canton, OH (US)

(73) Assignee: Alpha Security Products, Inc., North Canton, OH (US)

( * ) Notice: Subject to any disclaimer, the term of this patent is extended or adjusted under 35 U.S.C. 154(b) by 208 days.

(21) Appl. No.: 09/847,453

(22) Filed: May 2, 2001

(65) Prior Publication Data

US 2002/0003095 A1 Jan. 10, 2002

Related U.S. Application Data

(60) Provisional application No. 60/201,389, filed on May 3, 2000.

(51) Int. Cl.[7] .............................................. E05C 19/10
(52) U.S. Cl. ..................... 292/116; 292/148; 292/156; 292/137; 292/302; 292/DIG. 11; 220/315
(58) Field of Search .................................. 292/116, 137, 292/156, 251.5, 31, 120, 145, 148, 150, 162, 302, 303, DIG. 11; 206/308.2; 70/57.1; 220/315, 836; B65D 85/30, 85/57

(56) References Cited

U.S. PATENT DOCUMENTS

| | | | | | |
|---|---|---|---|---|---|
| 683,557 | A | * | 10/1901 | Du Bois | 292/162 |
| 1,163,002 | A | * | 12/1915 | Goddard | 292/145 |
| 1,520,038 | A | * | 12/1924 | Tueckmantel | 292/42 |
| 1,666,654 | A | * | 4/1928 | Hiering | 70/67 |
| 1,919,076 | A | * | 7/1933 | Schoenfeld | 70/57.1 |
| 2,152,081 | A | * | 3/1939 | Nelson | 292/147 |
| 2,478,434 | A | * | 8/1949 | Swanson | 292/31 |
| 2,637,194 | A | * | 5/1953 | Pietri | 70/66 |
| 2,907,196 | A | * | 10/1959 | Duttine | 70/67 |
| 3,103,114 | A | * | 9/1963 | Atkinson | 70/71 |
| 3,240,039 | A | * | 3/1966 | Baermann | 70/71 |
| 3,958,125 | A | * | 5/1976 | Zechmair et al. | 250/480 |
| 4,153,178 | A | * | 5/1979 | Weavers | 220/306 |
| 4,469,225 | A | * | 9/1984 | Takahashi | 206/387 |
| 4,576,307 | A | * | 3/1986 | Frydenberg | 220/324 |
| 4,962,800 | A | * | 10/1990 | Owiriwo | 150/118 |
| 4,966,020 | A | * | 10/1990 | Fotheringham et al. | 70/276 |
| 5,375,712 | A | * | 12/1994 | Weisburn | 206/387 |
| 5,680,782 | A | * | 10/1997 | Komatsu et al. | 70/54.1 |
| 5,782,350 | A | * | 7/1998 | Weisburn et al. | 206/308.2 |
| 5,931,291 | A | * | 8/1999 | Sedon et al. | 206/1.5 |
| 5,943,886 | A | * | 8/1999 | Chiang | 70/70 |
| 5,988,376 | A | * | 11/1999 | Lax | 206/308.2 |
| 6,102,200 | A | * | 8/2000 | Dressen et al. | 206/308.2 |
| 6,125,668 | A | * | 10/2000 | Belden, Jr. | 70/57.1 |
| 6,374,648 | B1 | * | 4/2002 | Mitsuyama | 70/57.1 |
| 6,416,090 | B1 | * | 7/2002 | Schechtel et al. | 292/303 |
| 6,430,976 | B1 | * | 8/2002 | Mitsuyama | 70/57.1 |

FOREIGN PATENT DOCUMENTS

| | | |
|---|---|---|
| EP | 0 483 422 A1 | 5/1992 |
| EP | 0 616 103 A1 | 9/1994 |
| EP | 0 640 737 A1 | 3/1995 |
| FR | 2 678 907 A1 | 1/1993 |
| WO | WO 98/17883 | 4/1998 |

\* cited by examiner

*Primary Examiner*—J. J. Swann
*Assistant Examiner*—Carlos Lugo
(74) *Attorney, Agent, or Firm*—Sand & Sebolt

(57) ABSTRACT

A security box for holding items of recorded media includes a base and a lid hinged together between open and closed positions. At the end of the base opposite the hinged connection with the lid, a lock slide is positioned and movable between locked and unlocked positions. The lid includes a tooth that passes through an opening in the base as the lid is pivoted between the open and closed positions. The lock slide includes a tooth that moves between the tooth of the lid and the opening of the base when the lock slide is in the locked position.

19 Claims, 10 Drawing Sheets

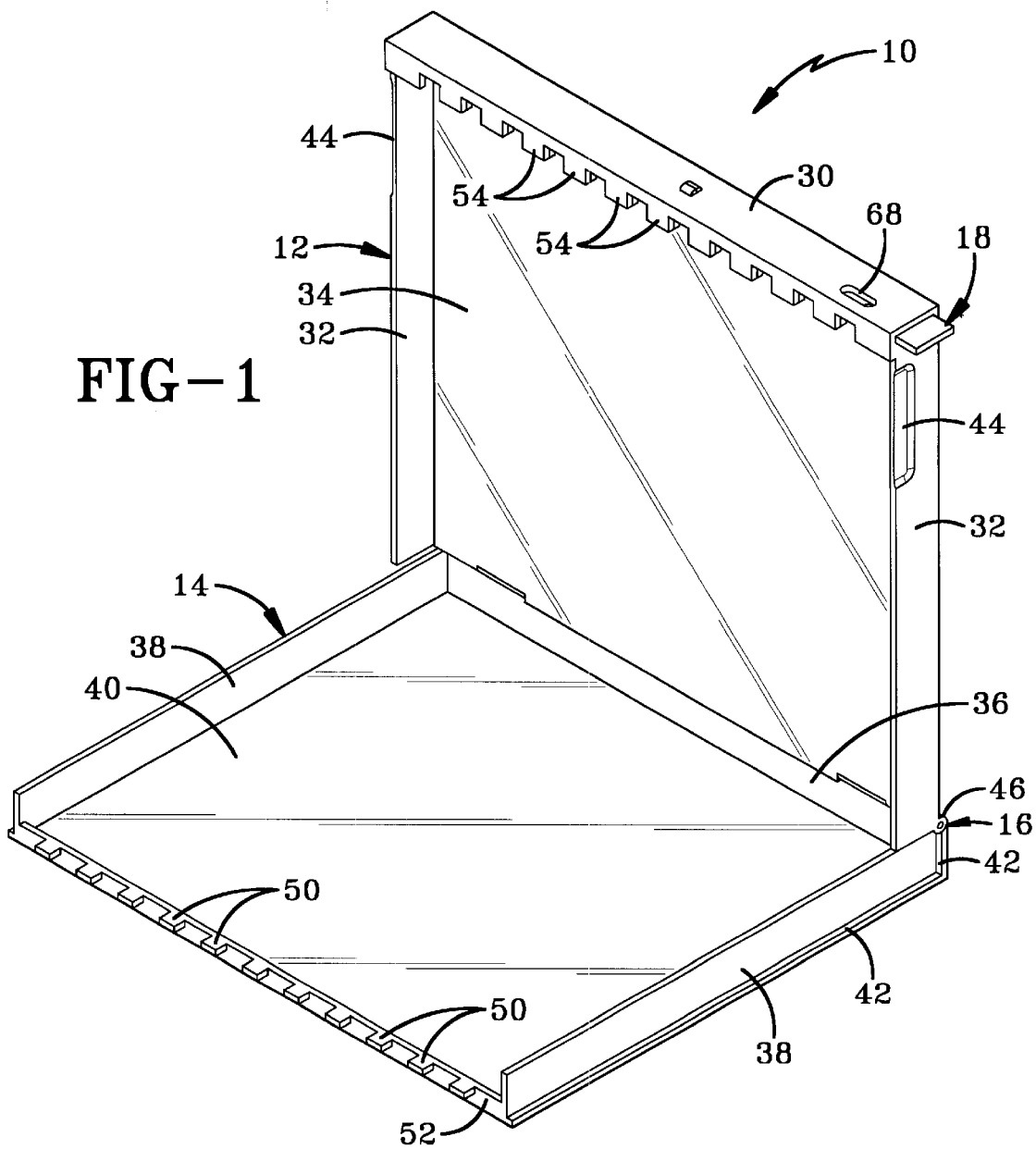
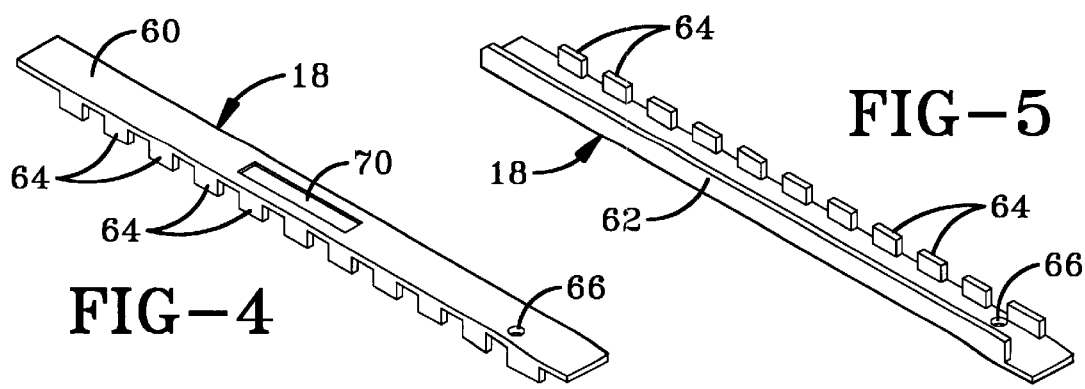

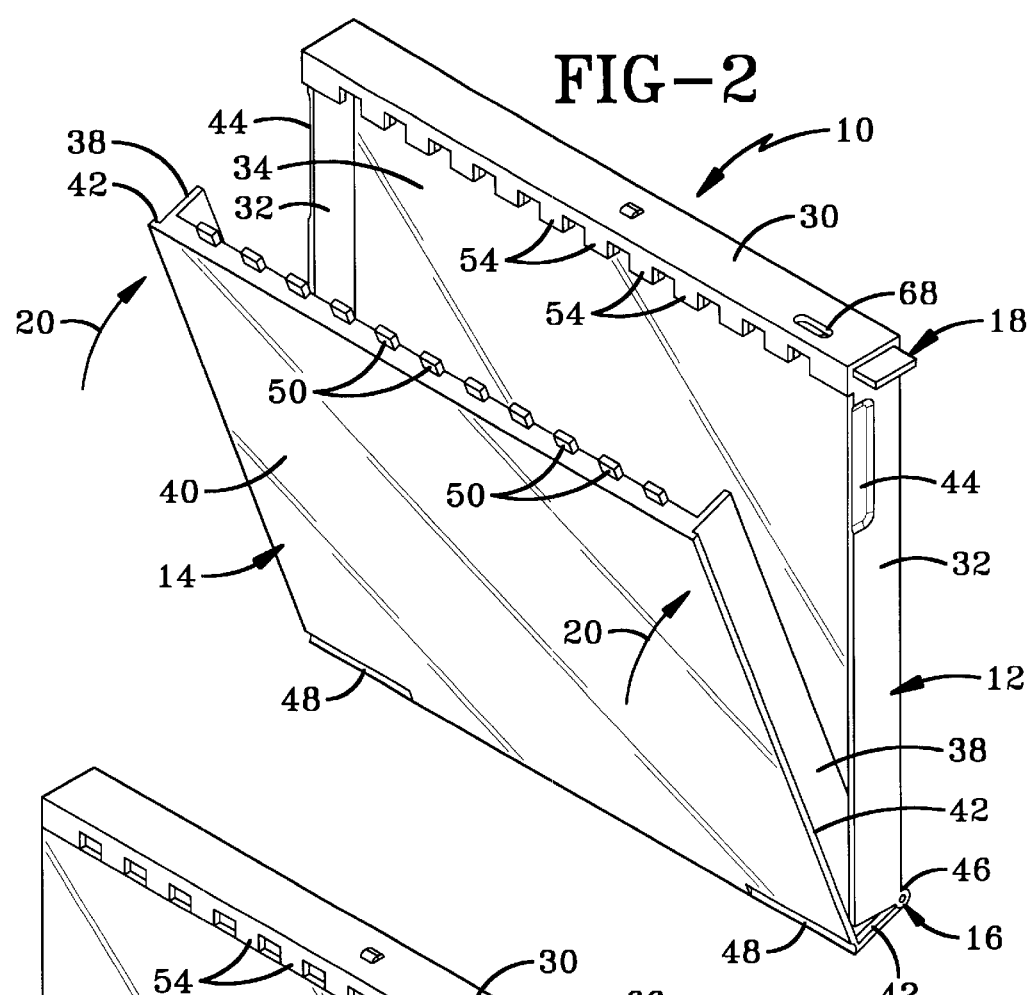
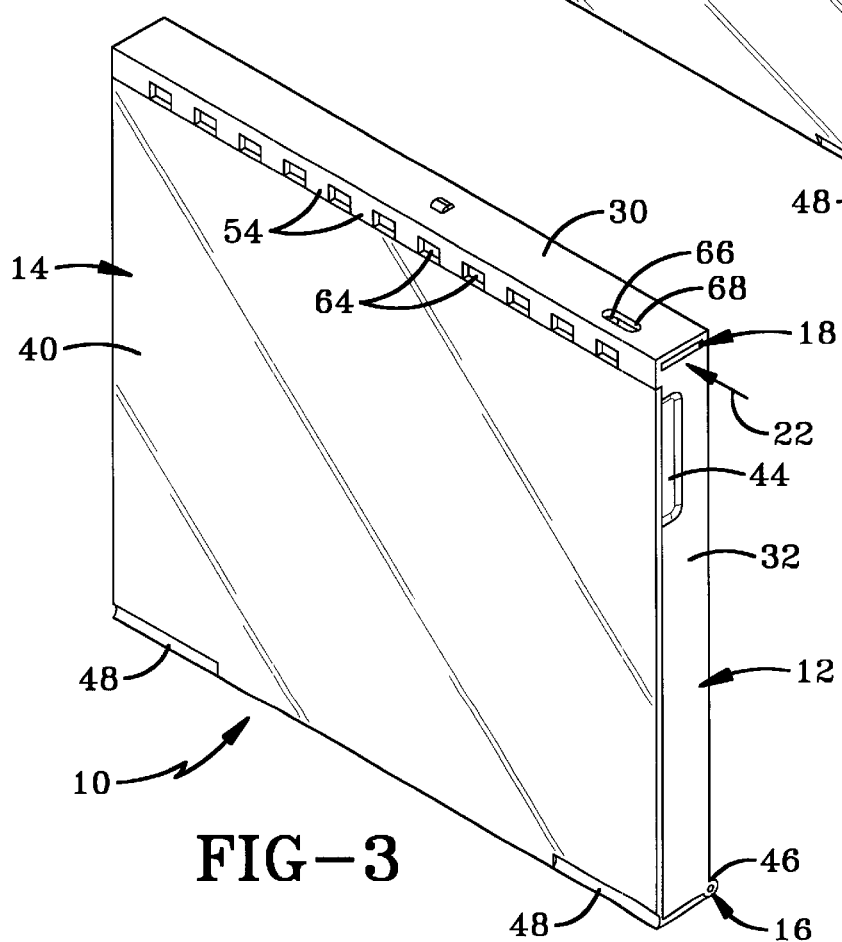

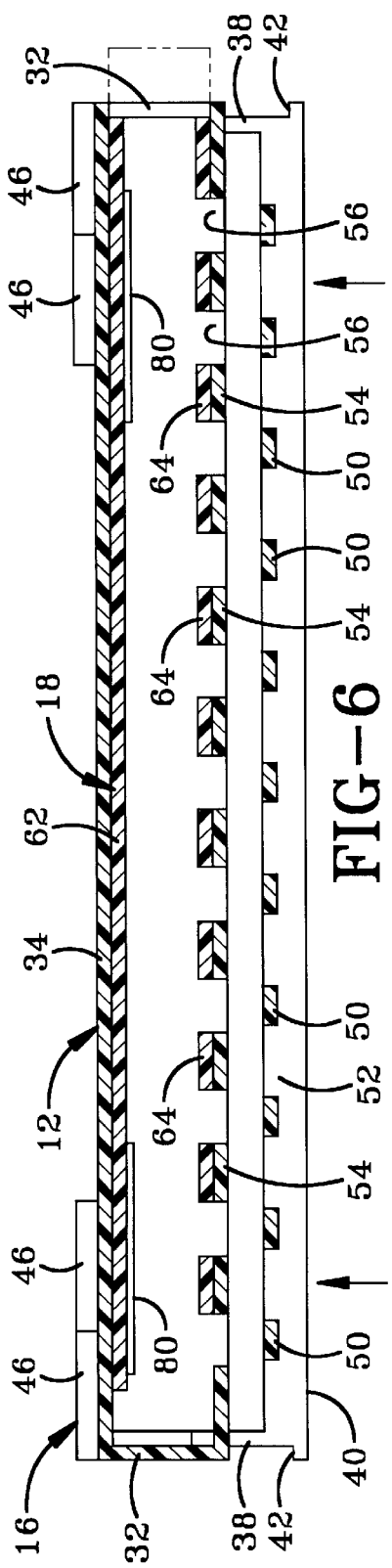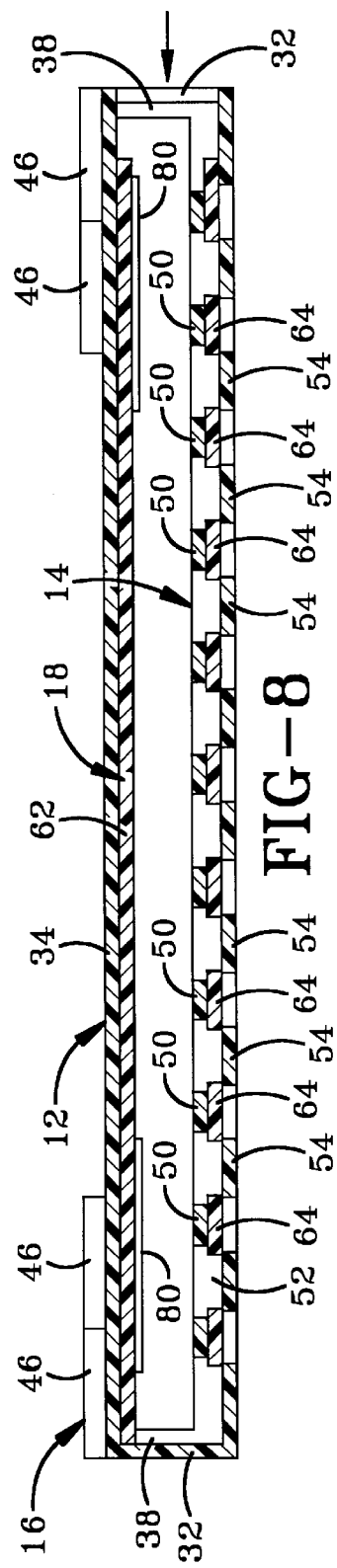

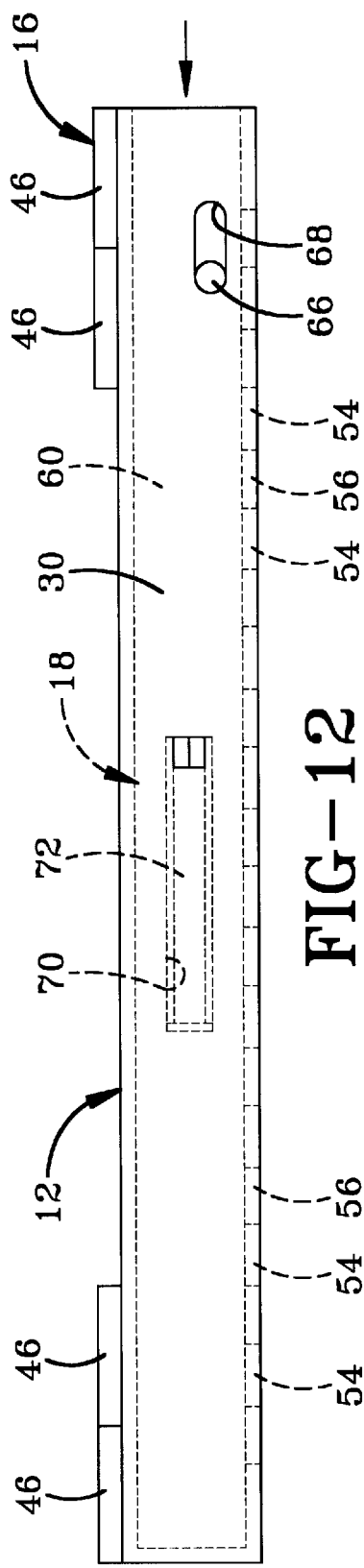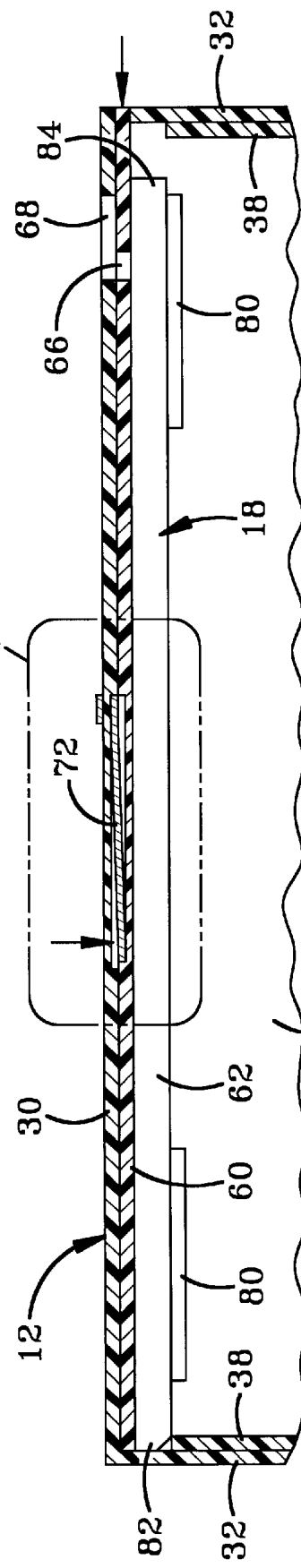

SECURITY BOX FOR RECORDED MEDIA

CROSS-REFERENCE TO RELATED APPLICATION

This application claims priority from U.S. provisional application serial No. 60/201,389 filed May 3, 2000; the disclosures of which are incorporated herein by reference.

BACKGROUND OF THE INVENTION

1. Technical Field

The present invention generally relates to security devices and, more particularly, to a six-sided box having a hinged lid for storing DVD and CD jewel boxes. Specifically, the invention relates to a security storage container having a lock slide that is used to securely lock jewel boxes inside the security box. The overall dimensions of the security box are only slightly larger than the overall dimensions of the jewel box in order to save valuable shelf space.

2. Background Information

Lightweight inexpensively molded plastic containers have been used in recent times to display items of recorded media for sale. Retail sales establishments desire containers to be lockable to prevent unauthorized removal of the items of recorded media from the containers. The containers themselves, or the items of recorded media, preferably hold an EAS (Electronic Article Surveillance) tag that will sound an alarm if a thief removes the EAS tag from the retail establishment. The lock on the container prevents the thief from removing the EAS tag or from removing the item of recorded media from the security box.

Many different security boxes are known in the art and various types of locking mechanisms are used to maintain the security devices in the locked position. Although existing security storage containers function for their intended purposes, there remains room in the art for an improved design. The art generally desires the overall dimensions of the security storage container to be only slightly larger than the item of recorded media so that the retail establishment does not have to add an excessive amount of shelf space to use the security boxes. Retail establishments also desire security boxes that are easy to unload so that the retail clerk does not have to spend excessive time unlocking and unloading the security storage container. Another problem in the art is that security storage containers are typically loaded with automated machinery. The design of the security storage container must allow items of recorded media to be automatically loaded into the security storage container by automated equipment. The design of the security storage container must also allow the device to be closed and locked after it is loaded.

SUMMARY OF THE INVENTION

The invention provides a security box for holding items of recorded media wherein the security box includes a base and a lid having first and second ends. The lid and base are connected by hinges at one end with a lock slide being carried by the base at the other end. The lock slide engages the lid when the lid is in the closed position and the lock slide is in the locked position to prevent the lid from moving to the open position.

The invention also provides a locking arrangement wherein at least one tooth on the lid passes through an opening in the base that is then blocked by the lock slide when the lock slide is moved to the locked position.

BRIEF DESCRIPTION OF THE DRAWINGS

The preferred embodiment of the invention, illustrative of the best mode in which applicant contemplated applying the principles of the invention, is set forth in the following description and is shown in the drawings and is particularly and distinctly pointed out and set forth in the appended Claims.

FIG. 1 is a perspective view of the security storage container of the present invention in an open position;

FIG. 2 is a perspective view of the security storage container of the present invention with the lid being closed;

FIG. 3 is a perspective view of the security storage container of the present invention with the lid closed and the lock slide being in the closed position;

FIG. 4 is a top perspective view of the lock slide of the security storage container;

FIG. 5 is a bottom perspective view of the lock slide of the security storage container;

FIG. 6 is a top sectional view taken through the lock slide showing the lid and the lock slide in unlocked positions;

FIG. 7 is a view similar to FIG. 6 showing the lid in a closed position and the lock slide in an unlocked position;

FIG. 8 is a view similar to FIG. 6 showing the lid in the closed position and the lock slide in the locked position;

FIG. 12 is a view similar to FIG. 9 showing the lock slide and locking tab in a locked position;

FIG. 13 is a view similar to FIG. 10 showing the lock slide and locking tab in a locked position;

Similar numbers refer to similar parts throughout the specification.

DESCRIPTION OF THE PREFERRED EMBODIMENTS

Figure 9:
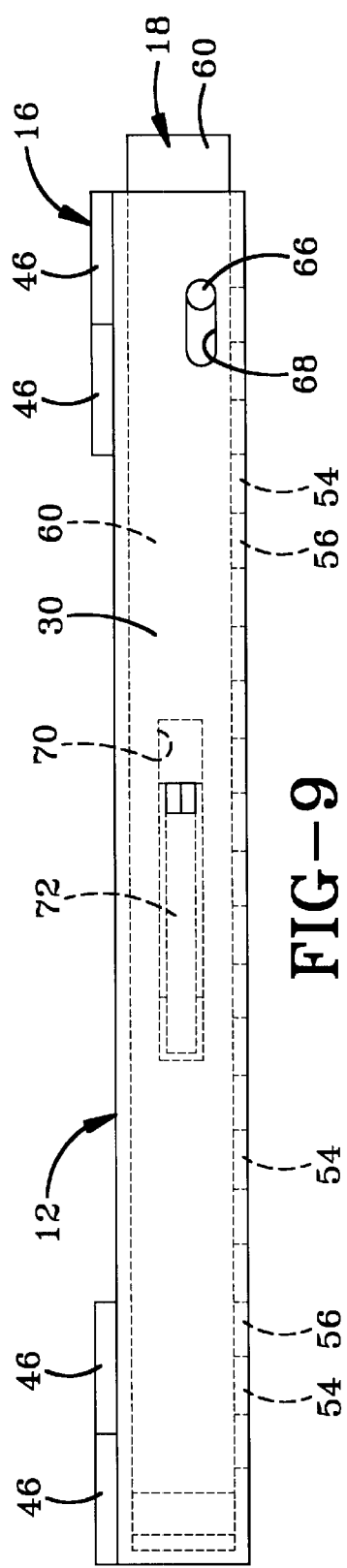
FIG. 9 is a top plan view of the security storage container showing the lock slide in an unlocked position and the locking tab in an unlocked position.
Figure 10:
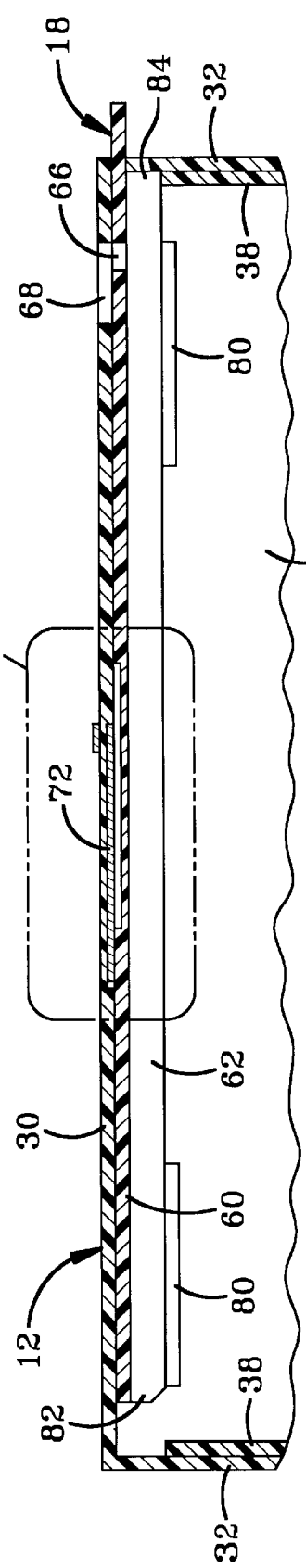
FIG. 10 is a side sectional view showing the lock slide and locking tab in unlocked positions.
Figure 11:
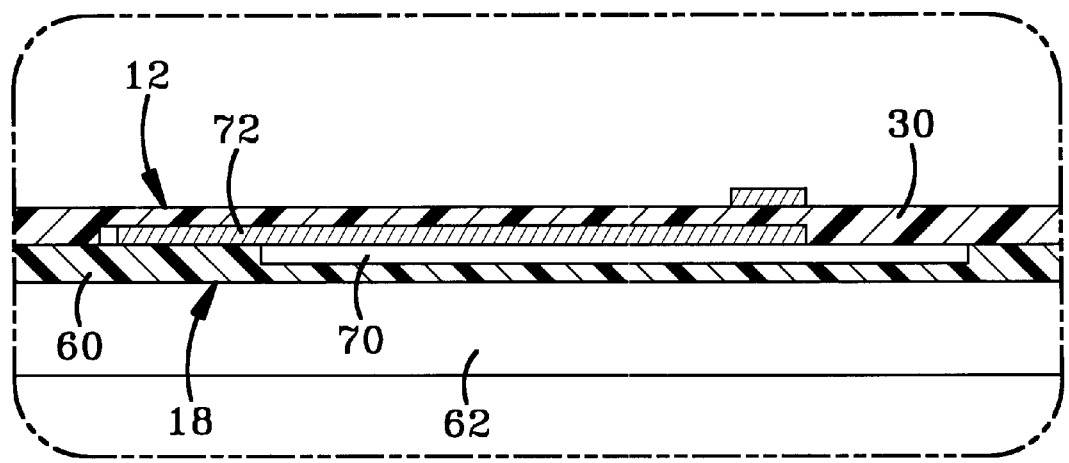
FIG. 11 is an enlarged view of the encircled portion of FIG. 10.

The security storage container of the present invention is indicated generally by the numeral 10 in the accompanying drawings. Security storage container 10 generally includes a base 12 and a lid 14 that is connected to base 12 by a pair of hinges 16. Lid 14 moves between open and closed positions. A storage compartment is defined between lid 14 and base 12 when lid 14 is in the closed position. A lock slide 18 is carried by base 12 and moveable between locked and unlocked positions. Lock slide 18 is configured to lock lid 14 in the closed position to prevent unauthorized access to the storage compartment.

The operation of security storage container 10 may be generally viewed in FIGS. 1–3. In FIG. 1, lid 14 is entirely open to a position where it may be loaded with an item of recorded media such as a CD or DVD jewel box. In FIG. 2, lid 14 is being moved toward the closed position as indicated by arrows 20. In this position, lock slide 18 is moved to the unlocked position. In FIG. 3, lid 14 is in the closed position and lock slide 18 has been moved to the locked position as indicated by arrow 22. In this position, a key 24 (FIGS. 15–17) is required to open security storage container 10 to remove its contents. The use and function of key 24 will be described below in detail.

Base 12 generally includes a top wall 30, a pair of sidewalls 32 extending generally perpendicular from top wall 30, and a back wall 34. Back wall 34 is generally planar and extends between sidewalls 32 and top wall 30. In other embodiments of the invention, back wall 34 may include openings that allow the manufacturer to reduce the amount of material used to form security storage container 10. In the preferred embodiment of the invention, each wall 30, 32, and 34 may be fabricated from a transparent material to allow the consumer to view the contents of security storage container 10. In another preferred embodiment, top wall 30 may be fabricated from an opaque material that prevents a shoplifter from viewing the lock mechanism of security storage container 10.

Lid 14 generally includes a bottom wall 36, a pair of sidewalls 38 extending generally perpendicular from bottom wall 36, and a front wall 40 extending between bottom wall 36 and side walls 38. As with base 12, walls 36, 38, and 40 of lid 14 are preferably fabricated from a transparent material to allow the consumer to view the contents of security storage container 10. Front wall 40 is preferably a solid wall but may also include openings to reduce the overall amount of material used to form security storage container 10.

Each side wall 38 is inset from the outer edge of front wall 40 and bottom wall 36 to form a ledge 42 having a width substantially equal to the thickness of side wall 32 of base 12. Ledge 42 receives side wall 32 when lid 14 is in the closed position as depicted in FIGS. 2 and 3. Walls 38 are spaced apart a distance substantially equal to the length or width dimension of a standard item of recorded media such as a CD or DVD jewel box such that the overall width of security storage container 10 is only larger than the width or length of the item of recorded media by the thickness of both side walls 38 and both side walls 32.

Each side wall 32 includes a finger access depression 44 that allows the user of security storage container 10 to easily grasp ledge 42 when lid 14 is in the closed position. Finger access depressions 44 thus allow the retail clerk to easily open lid 14 once security storage container 10 is unlocked.

Each hinge 16 includes a hinge pin extending between a pair of protuberances 46 that extend from back wall 34 and bottom wall 36. In order to reduce shipping space and to allow security storage container 10 to nest together, the bottom of front wall 40 and the front edge of bottom wall 36 are provided with indentions 48 sized to receive protrusions 46 when two security storage containers 10 are stacked together.

Lid 14 additionally includes a plurality of first teeth 50. Teeth 50 preferably extend substantially parallel to front wall 40 and are disposed substantially evenly between side walls 38. Teeth 50 are preferably offset from the front surface of front wall 40 as shown in FIG. 6. The offset may be achieved by providing an offset wall 52 connected to front wall 40 and side walls 38.

Base 12 includes a plurality of second teeth 54 extending downwardly from the front edge of top wall 30. Each second tooth 54 is slightly wider than each first tooth 50 as depicted in FIG. 6. Teeth 54 are staggered with respect to teeth 50 allowing first teeth 50 to pass through the openings 56 between second teeth 54. First teeth 50 do not engage the edges of second teeth 54 because opening 56 are wider than the width of each first tooth 50.

Slide 18 includes a main wall 60, a back slide wall 62, and a plurality of slide teeth 64 spaced from back slide wall 62. Slide teeth 64 and back slide wall 62 each extending the same direction from main wall 60 and are substantially parallel. Slide teeth 64 are preferably disposed at the same spacing as second teeth 54 and are preferably the same width as second teeth 54. As such, opening 56 is formed when slide 18 is in the unlocked position. When slide 18 is moved to the locked position as depicted in FIG. 8, each opening 56 is closed by slide teeth 64. As shown in FIG. 8, teeth 50 are offset far enough to allow slide teeth 64 to slide between teeth 50 and teeth 54 so as to lock teeth 50 in position by preventing teeth 50 from moving back through openings 56. Main wall 60 includes a key opening 66 that is aligned with a second key opening 68 formed in top wall 30 of base 12. Second key opening 68 is elongated such that key opening 66 may be accessed through second key opening 68 when slide 18 is in both the locked and unlocked positions.

Figure 14:
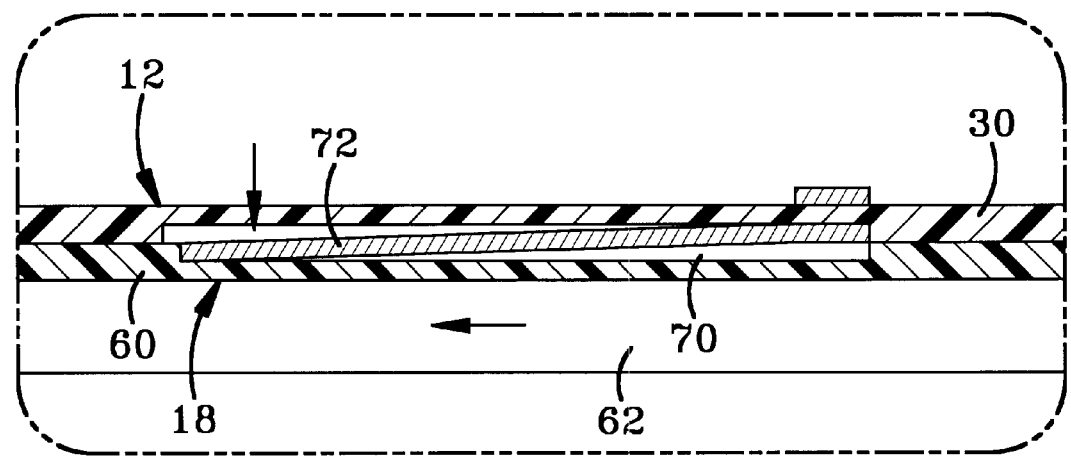
FIG. 14 is an enlarged view of the encircled portion of FIG. 13.

Slide 18 further includes a locking channel 70 that receives a locking member 72 when slide 18 is in the locked position as depicted in FIGS. 13 and 14. Locking member 72 is preferably fabricated from a material that may be moved in a magnetic field. Locking member 72 is preferably resiliently biased toward locking channel 70 so that locking member 72 automatically moves into locking channel 70 when slide 18 is moved to the locked position. Locking member 72 may be attached to top wall 30 by any of a variety of appropriate connectors.

Figure 15:
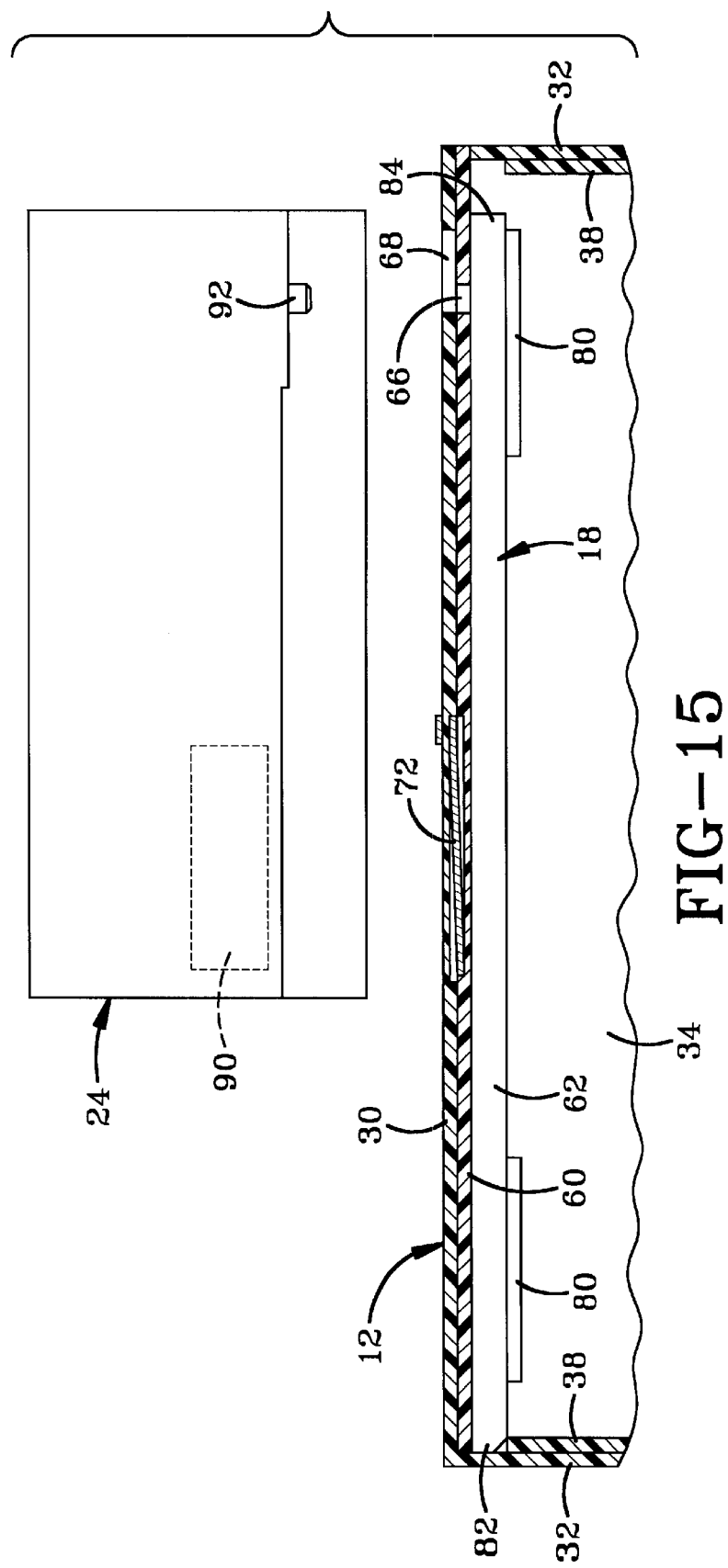
FIG. 15 is a view similar to FIG. 10 showing the security storage container aligned with a key.
Figure 17:
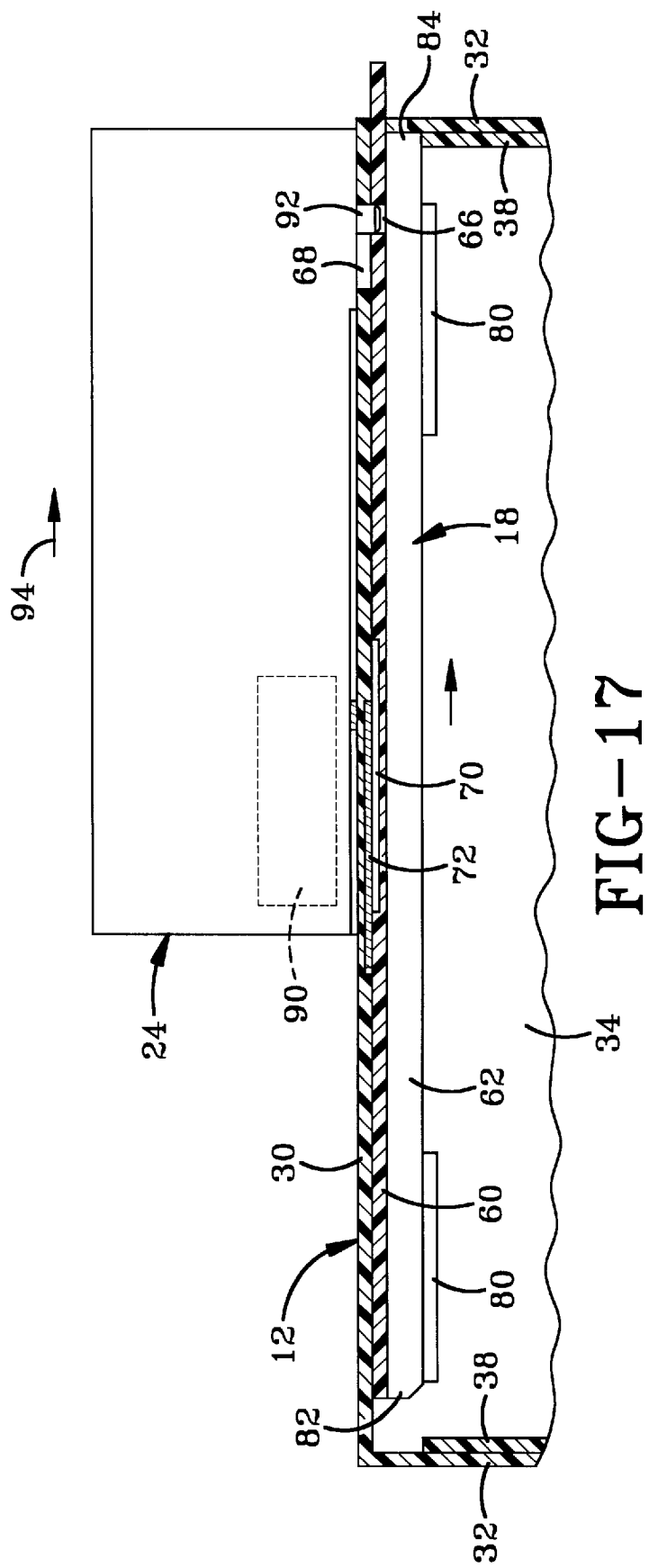
FIG. 17 is a view similar to FIG. 15 showing the key moving the lock slide to the unlocked position.

Slide 18 is carried by base 12 on at least a pair of supports 80. Supports 80 are preferably disposed on back wall 34. Supports 80 allow slide 18 to move back and forth between the locked and unlocked position. In the locked position, the inner end 82 of slide 18 preferably engages sidewall 32 as shown in FIGS. 13 and 15. In the unlocked position, the outer end 84 of slide 18 engages sidewall 32 as shown in FIG. 17. In the unlocked position of slide 18, a portion of main wall 60 protrudes through sidewall 32 so that slide 18 may be easily moved from the unlocked position to the locked position. The protruding portion of main wall 60 allows slide 18 to be locked by automated equipment after an item of recorded media has been loaded into the storage compartment of security storage container 10.

In operation, an item of recorded media such as a DVD or CD jewel box is loaded into the storage compartment of container 10 by placing the item of recorded media in either base 12 or lid 14 and then closing lid 14 as depicted in FIG. 2. Once lid 14 is closed, slide 18 is moved from the unlocked position to the locked position as depicted in FIG. 3. In this position, teeth 64 close openings 56 to trap teeth 50 in a locked position. Security storage container 10 is now locked with the item of recorded media securely held inside security storage container 10 where a shoplifter cannot remove an EAS tag from the item of recorded media while allowing the consumer to view substantially the entire surface area of the item of recorded media. The loading and locking process may be easily achieved by automated equipment because of the relatively simple movements required to load, close, and lock security storage container 10.

Figure 16:
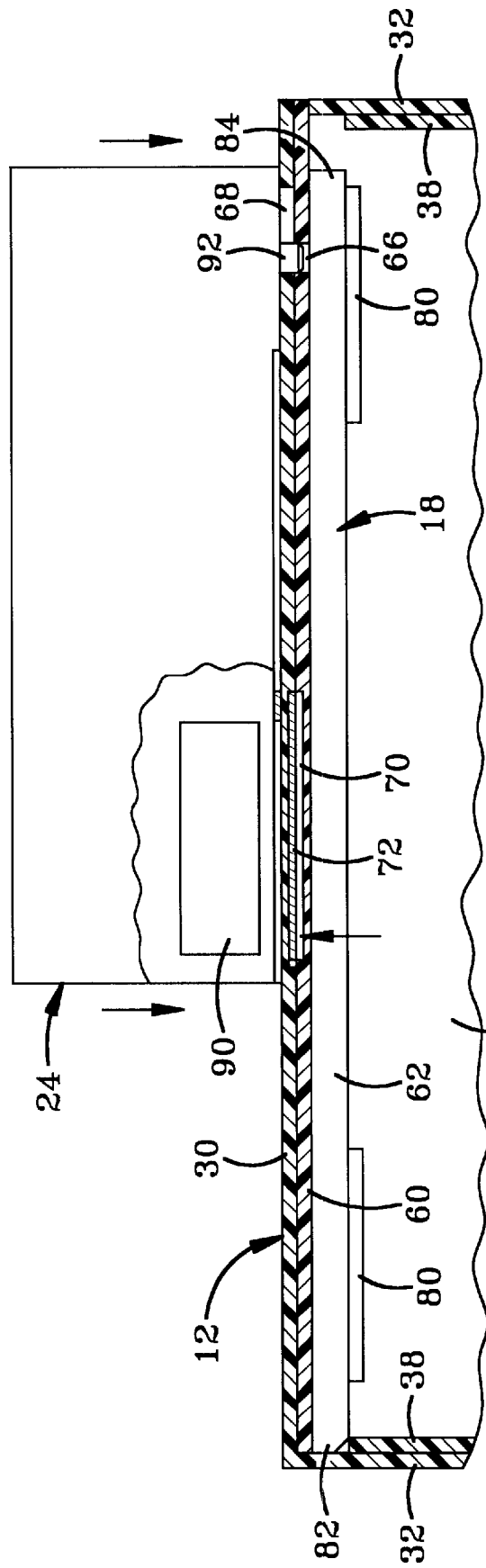
FIG. 16 is a view similar to FIG. 15 showing the security storage container engaged with the key and the magnet of the key moving the locking tab to the unlocked position.

When a store clerk is selling the item of recorded media to the consumer, the store clerk must open security storage container 10 and remove the item of recorded media. The store clerk is provided with a key 24 having a magnet 90 and an unlocking pin 92. Magnet 90 and unlocking pin 92 are spaced apart so that they align with openings 66, 68, and locking member 72 when security storage container 10 is brought into contact with key 24. The store clerk places key 24 onto security storage container 10 as depicted in FIG. 16 such that locking pin 92 engages key opening 66 and magnet 90 pulls locking member 72 toward key 24 to an unlocked position. Key 24 is then moved in the direction indicated by arrow 94 in FIG. 17 to move slide 18 to the unlocked position. Lid 14 may then be opened and the item of recorded media removed and sold to the consumer. In other embodiments of the invention, key 24 may be mounted to a counter top and security storage container 10 moved with respect to key 24.

Figure 18:
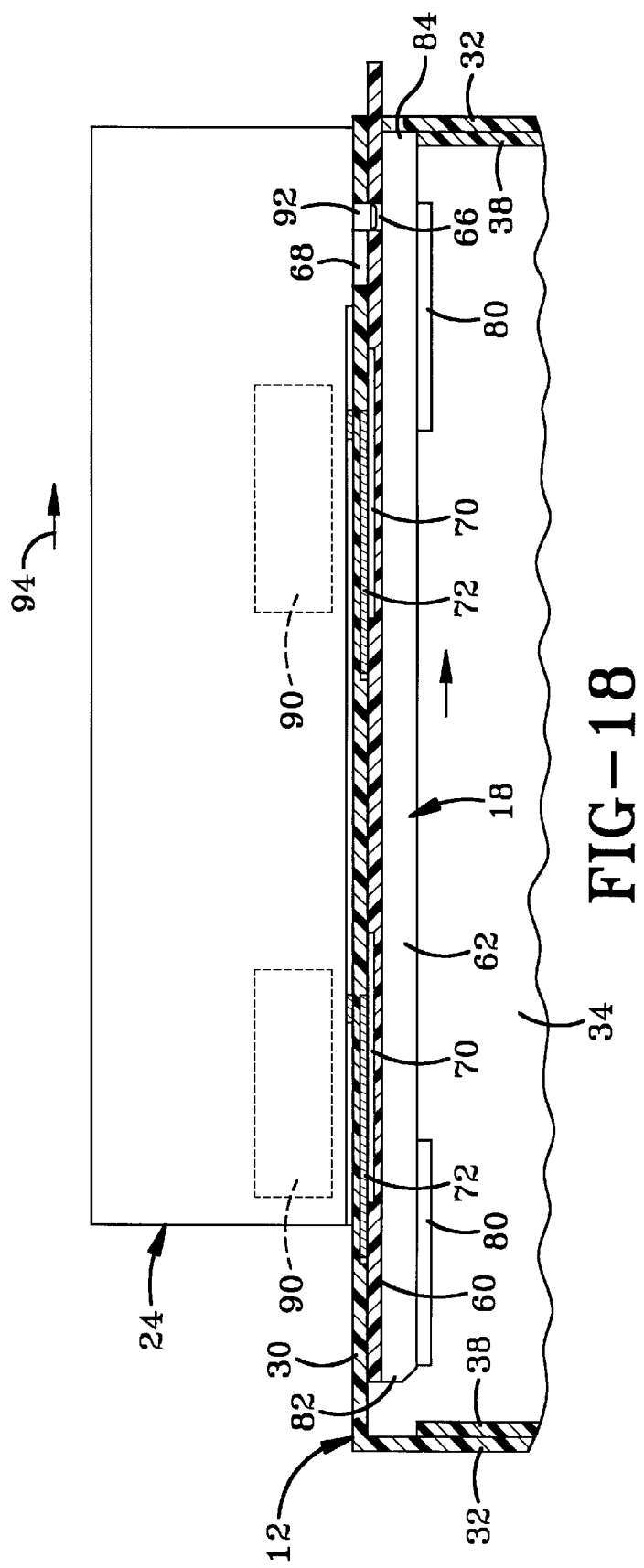
FIG. 18 is a view similar to FIG. 17 showing an alternative lock arrangement with dual locking members.

As shown in FIG. 18, another embodiment of storage container 10 may include a pair of locking members 72 that cooperate together to provide a secure locking arrangement to container 10. In this embodiment, key 24 includes two magnets 90 with one magnet being aligned with each locking member 72.

The present invention thus provides an improved security storage box for use with items of recorded media. Of course, the security box may be used with other items of merchandise. The security box of the invention provides a container that has overall container that are only slightly larger than the overall dimensions of the item of recorded media being held in the box. The locking mechanism of the security box may be locked and unlocked with automated equipment because the motions required to close and lock the box are relatively simple. The box allows the front, rear, bottom, and sides of the item of recorded media to be viewed by the consumer when the walls are fabricated from a transparent material. The device is easy to unlock by retail store clerk and frustrate shoplifters by hiding the lock slide within the box and providing no areas that may be easily attacked with a pry bar.

Accordingly, the improved security box for recorded media apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the security box for recorded media is constructed and used, the characteristics of the construction, and the advantageous new and useful results obtained; the new and useful structures, devices, elements, arrangements, parts, and combinations are set forth in the appended claims.

What is claimed is:

1. A security box for holding items of recorded media; the security box comprising:

a base having a first end, a second end, a top wall, a pair of sidewalls, and a back wall;

a lid having a first end, a second end, a bottom wall, a pair of sidewalls, and a front wall;

the first end of the lid being connected to the first end of the base with at least a first hinge and movable between open and closed positions;

the sidewalls of the lid being disposed inwardly of the sidewalls of the base when the lid is in the closed position;

the sidewalls of the lid being disposed inwardly of the sidewalls of the base when the lid is in the closed position;

a lock slide being carried by the base and including a tooth;

the lock slide being movable between locked and unlocked positions;

the lock slide being carried adjacent the second end of the base;

at least a first tooth extending from the second end of the lid;

the base defining an opening aligned with the tooth of the lid such that the tooth of the lid passes entirely through the opening as the lid pivots between the open and closed positions; when the lid is in the closed position, the entire tooth of the lid being disposed beyond the opening of the base to define a channel between the opening in the base and the tooth of the lid so that the slide tooth of the lock slide may move into and out of the channel;

the slide tooth being disposed between the tooth of the lid and the opening in the base when the lid is in the closed position and the lock slide is in the locked position so that the slide tooth prevents the tooth on the lid from passing through the opening in the base so as to prevent the lid from moving to the open position; and a locking mechanism that is movable between a locked position and an unlocked position; the locked position of the locking mechanism preventing the lock slide from moving from the locked position to the unlocked position.

2. The box of claim 1, wherein each of the sidewalls of the lid is inset from the outer edge of the front wall to define a ledge; the ledges abutting the base sidewalls when the lid is in the closed position.

3. The box of claim 2, wherein each sidewall of the base defines a finger access depression that allows the ledges to be contacted when the lid is in the closed position.

4. A security box for holding items of recorded media; the security box comprising:

a base having a first end and a second end;

a lid having a first end and a second end;

the first end of the lid being connected to the first end of the base with at least a first hinge and movable between open and closed positions;

a lock slide being carried by the base and including a tooth;

the lock slide being movable between locked and unlocked positions;

the lock slide being carried adjacent the second end of the base;

at least a first tooth extending from the second end of the lid;

the base defining an opening aligned with the tooth of the lid such that the tooth of the lid passes entirely through the opening as the lid pivots between the open and closed positions; when the lid is in the closed position, the entire tooth of the lid being disposed beyond the opening of the base to define a channel between the opening in the base and the tooth of the lid so that the slide tooth of the lock slide may move into and out of the channel;

the slide tooth being disposed between the tooth of the lid and the opening in the base when the lid is in the closed position and the lock slide is in the locked position so that the slide tooth prevents the tooth on the lid from passing through the opening in the base so as to prevent the lid from moving to the open position;

a locking mechanism that is movable between a locked position and an unlocked position; the locked position of the locking mechanism preventing the lock slide from moving from the locked position to the unlocked position; and no portion of the lock slide being disposed outside the base when the lock slide is in the locked position and wherein a portion of the lock slide extends from the base in the unlocked position.

5. The box of claim 4, wherein the base defines a key opening that provides access to the lock slide so that the lock slide may be moved between the locked and unlocked positions.

6. The box of claim 5, wherein the lock slide defines a key opening that is aligned with the key opening of the base.

7. The box of claim 4 wherein the base defines a hole through which the portion of the lock slide moves between the locked and unlocked positions.

8. A security box for holding items of recorded media; the security box comprising:

a base having a first end and a second end;

a lid having a first end and a second end;

the first end of the lid being connected to the first end of the base with at least a first hinge and movable between open and closed positions;

a lock slide being carried by the base and including a tooth;

the lock slide being movable between locked and unlocked positions;

the lock slide being carried adjacent the second end of the base;

at least a first tooth extending from the second end of the lid;

the base defining an opening aligned with the tooth of the lid such that the tooth of the lid passes entirely through the opening as the lid pivots between the open and closed positions; when the lid is in the closed position, the entire tooth of the lid being disposed beyond the opening of the base to define a channel between the opening in the base and the tooth of the lid so that the slide tooth of the lock slide may move into and out of the channel;

the slide tooth being disposed between the tooth of the lid and the opening in the base when the lid is in the closed position and the lock slide is in the locked position so that the slide tooth prevents the tooth on the lid from passing through the opening in the base so as to prevent the lid from moving to the open position; and a magnetically actuated locking mechanism that is movable between a locked position and an unlocked position; the locked position of the locking mechanism preventing the lock slide from moving from the locked position to the unlocked position.

9. The box of claim 8, wherein the locking mechanism includes a biased locking member connected to the base; the locking member having a free end extending toward the lock slide.

10. The box of claim 9, wherein the lock slide defines a locking channel that receives the free end of the locking member when the lock slide is in the locked position.

11. A security box for holding items of recorded media; the security box comprising:

a base having a first end and a second end;

a lid having a first end and a second end;

the first end of the lid being connected to the first end of the base with at least a first hinge and movable between open and closed positions;

a lock slide being carried by the base and including a plurality of teeth;

the lock slide being movable between locked and unlocked positions;

the lock slide being carried adjacent the second end of the base;

a plurality of spaced teeth extending from the second end of the lid;

the base defining a plurality of openings each aligned with a respective tooth of the lid such that each tooth of the lid passes completely through one of the openings as the lid pivots between the open and closed positions; when the lid is in the closed position, each entire tooth of the lid being disposed beyond the respective opening of the base to define a channel between the opening in the base and the teeth of the lid so that the slide teeth of the lock slide may move into and out of the channel;

one slide tooth corresponding to each opening defined by the base;

each slide tooth of the lock slide being disposed between a respective tooth of the lid and a respective opening in the base to completely block the respective opening of the base when the lid is in the closed position and the lock slide is in the locked position so that the slide teeth prevent the teeth on the lid from passing through respective openings in the base so as to prevent the lid from moving to the open position; and a locking mechanism that is movable between a locked position and an unlocked position; the locked position of the locking mechanism preventing the lock slide from moving from the locked position to the unlocked position.

12. The box of claim 11 wherein the base includes a plurality of teeth, each adjacent pair of which defines therebetween one of the openings in the base; and wherein, with the lid in the closed position and the slide tooth in the locked position, the slide tooth abuts two adjacent teeth of the base and a tooth of the lid to create an interference therebetween during an attempt to move the lid to the open position.

13. A security box for holding items of recorded media; the security box comprising:

a base having a first end and a second end;

a lid having a first end and a second end;

the first end of the lid being connected to the first end of the base with at least a first hinge and movable between open and closed positions;

a lock slide being carried by the base;

the lock slide being movable between locked and unlocked positions;

the lock slide being carried adjacent the second end of the base;

no portion of the lock slide extending from the base when the lock slide is in the locked position;

at least a first tooth extending from the second end of the lid;

the base defining an opening aligned with the tooth of the lid such that the tooth of the lid passes through the opening as the lid is pivoting between the open and closed positions;

the lock slide including a slide tooth disposed between the tooth of the lid and the opening in the base when the lid is in the closed position and the lock slide is in the locked position to prevent the lid from moving to the open position;

a locking mechanism that is movable between a locked position and an unlocked position; the locked position of the locking mechanism preventing the lock slide from moving from the locked position to the unlocked position;

the base defining a key opening that provides access to the lock slide so that the lock slide may be moved between the locked and unlocked positions; and the lock slide defining a key opening that is aligned with the key opening of the base.

14. The box of claim 13, wherein the locking mechanism is magnetically actuated.

15. The box of claim 14, wherein the locking mechanism includes a biased locking member connected to the base; the locking member having a free end extending toward the lock slide.

16. The box of claim 15, wherein the lock slide defines a locking channel that receives the free end of the locking member when the lock slide is in the locked position.

17. The box of claim 13, wherein the lid includes a plurality of spaced teeth and the base defines a plurality of openings; each tooth of the lid passing completely through an opening of the base as the lid pivots between the open and closed positions.

18. The box of claim 17, wherein the lock slide includes a slide tooth that corresponds to each opening defined by the base; each slide tooth of the lock slide completely blocking an opening of the base when the lock slide is in the locked position.

19. A security box for holding items of recorded media; the security box comprising:

a base having a first end and a second end;

a lid having a first end and a second end;

the first end of the lid being connected to the first end of the base with at least a first hinge and movable between open and closed positions;

a lock slide being carried by the base;

the lock slide being movable between locked and unlocked positions;

the lock slide being carried adjacent the second end of the base;

no portion of the lock slide being disposed outside the base when the lock slide is in the locked position;

a portion of the lock slide extending from the base in the unlocked position;

at least a first tooth extending from the second end of the lid;

the base defining an opening aligned with the tooth of the lid such that the tooth of the lid passes through the opening as the lid is pivoting between the open and closed positions;

the lock slide including a slide tooth disposed between the tooth of the lid and the opening in the base when the lid is in the closed position and the lock slide is in the locked position to prevent the lid from moving to the open position; and a locking mechanism that is movable between a locked position and an unlocked position; the locked position of the locking mechanism preventing the lock slide from moving from the locked position to the unlocked position.

* * * * *